United States Patent [19]
Wu

[11] Patent Number: 5,438,267
[45] Date of Patent: Aug. 1, 1995

[54] SINGLE-SWITCHING METHOD OF ELIMINATING THE EFFECT OF ELECTROMAGNETIC COUPLING BETWEEN A PAIR OF RECEIVERS

[75] Inventor: Jian-Qun Wu, Houston, Tex.

[73] Assignee: Baker Hughes Incorporated, Houston, Tex.

[21] Appl. No.: 188,064

[22] Filed: Jan. 26, 1994

[51] Int. Cl.$^6$ .................... G01V 3/28; G01V 3/30
[52] U.S. Cl. .................... 324/339; 324/338; 324/344
[58] Field of Search .................... 324/334, 338–344, 324/239–243

[56] References Cited

U.S. PATENT DOCUMENTS

| | | | |
|---|---|---|---|
| 2,790,138 | 4/1957 | Poupon | 324/339 |
| 3,849,721 | 11/1974 | Calvert | 324/338 |
| 4,185,238 | 1/1980 | Huchital et al. | 324/338 |
| 4,636,731 | 1/1987 | Savage et al. | 324/338 |
| 4,968,940 | 11/1990 | Clark et al. | 324/338 |
| 5,210,495 | 5/1993 | Hapashy et al. | 324/338 |

*Primary Examiner*—Gerard R. Strecker
*Attorney, Agent, or Firm*—Gunn & Associates

[57] ABSTRACT

The invention is directed toward the elimination of the effects of electromagnetic coupling between pairs of receivers. The preferred embodiment encompasses the measurement of resistivity and other electromagnetic properties of earth formation in a borehole environment. The invention also incorporates techniques for eliminating the effects of receiver antenna drift and the effects of power variations of two or more transmitters.

27 Claims, 2 Drawing Sheets

SINGLE-SWITCHING METHOD OF ELIMINATING THE EFFECT OF ELECTROMAGNETIC COUPLING BETWEEN A PAIR OF RECEIVERS

BACKGROUND OF THE DISCLOSURE

The present disclosure is directed toward the measurement of electromagnetic properties of earth formations penetrated by a borehole. Measurements are made during the drilling operation or subsequent to the drilling operation. More particularly, the disclosure is directed toward the measure of resistivity or other electromagnetic properties by using one or more transmitters which induce an alternating voltage into the borehole and earth formation and by using multiple, longitudinally spaced receivers to detect the phase and amplitude of electromagnetic radiation induced within the borehole and formation. The receivers respond to different radial depths and therefore exhibit different "depths of investigation". Receiver responses are then combined to minimize the adverse effects of the borehole region and emphasize the response component from the formation thereby yielding a more accurate measure of the resistivity of the formation. Information related to variations in formation resistivity as a function of radial distance from the center of the borehole can also be extracted from the multiple receiver responses. The disclosure is even more particularly directed toward the elimination of the adverse effects of mutual coupling between multiple receivers, noting the receivers are coils subject to mutual coupling.

Induction techniques have been used for a number of years to determine the resistivity of earth formations penetrated by a borehole. Conceptually, an alternating current is applied to a transmitter of a borehole instrument thereby generating a primary electromagnetic field in earth formation in the vicinity of the transmitter. The primary field interacts with the earth formation thereby setting up a secondary field with amplitude and phase of this secondary field being related to the resistivity and other electromagnetic properties of the formation. Fluids in the borehole and the invasion of these borehole fluids into the formations can adversely effect the true resistivity measurement of virgin formation. Multiple receivers located at different longitudinal spacings from the transmitter are employed to measure the secondary field and minimize the effects of borehole and near borehole environs. The spacing between the transmitter and receiver determines to some extent the effective radial depth of the apparent formation resistivity measurement. The average radial depth of the resistivity measurements tends to increase as transmitter-receiver spacing increases if all other parameters are held constant. Therefore, the responses at receivers at two or more different longitudinal spacings can be combined to minimize the adverse effects of the borehole and near borehole environs on a true formation resistivity measurement.

Mutual coupling between pairs of receivers in multiple receiver resistivity devices can introduce error in formation resistivity measurements unless steps are taken to minimize these effects. The effects of mutual coupling are of increasing concern as more accurate and precise formation resistivity measurements are sought, especially in formations exhibiting high resistivity. The phenomena of mutual coupling will be described briefly by using as an example a borehole measuring system with an elongated downhole supportive body supporting a single transmitter and two longitudinally spaced receivers. The receivers are coils constructed so that the physical and electrical properties are as near the same as possible in practical application. The axes of the coils are parallel and are also parallel with the axis of the elongated downhole component of the system. On a common tubular body, the axes are also common or coincident. Primary and secondary fields induced within the formation and in the vicinity of the measuring instrument also induce voltages within the receivers. Voltage is the measured parameter at each receiver coil with the amplitude and phase of the voltage being related to resistivity of the formation at different depths of investigation. Each measured voltage also includes a component resulting from mutual coupling of the receiver pair. The transmitter induces an alternating current and corresponding voltage within the first receiver coil. Alternating current flowing within the first receiver coil also acts as a transmitter and induces a coupled current and associated voltage within the coil of the second receiver. This coupled voltage adds to the voltage induced by the secondary field generated within the formation. The total alternating current flowing within the coil of the second receiver likewise acts as a transmitter and likewise induces a coupled voltage component within the first receiver coil. Accurate formation resistivity measurements are predicated upon accurate measures of voltage induced within the earth formation and the elimination of, or compensation for, voltage components resulting from coupled receiver signals.

In prior measurement systems comprising one transmitter and two receivers, resistivity is computed from the ratio of receiver response in order to minimize borehole effects. $V_{m,1}$ and $V_{m,2}$ are defined as the measured voltages induced in receivers 1 and 2, respectively, where receiver 1 is at a shorter spacing with respect to the transmitter. Furthermore, $V_{m,1}=V_1X_1S$ and $V_{m,2}=V_2X_2S$ where $V_1$ and $V_2$ are unpreturbed voltages measured at receivers 1 and 2, respectively, $X_1$ and $X_2$ are terms which include the impedance associated with receivers 1 and 2, respectively, and S represents a term proportional to the power of the transmitter. The impedance portion of the terms $X_1$ and $X_2$ can vary as a function of temperature and other parameters. This variation is referred to as antenna drift. $V_1$ and $V_2$ are the desired parameters needed to compute accurate formation resistivities at the desired multiple depths of investigation. Defining $R=V_{1,m}/V_{2,m}$, one obtains $\log(R) = \log(X_1/X_2) + \log(V_1/V_2)$ with the power term S canceling. By suspending the measuring device in air, remote from any conducting material, one obtains $\log(R_{air})=\log((X_1/X_2)_{air})+\log((V_1/V_2)_{air})$. If it is assumed that $(X_1/X_2)=(X_1/X_2)$air, then $\log(R)=\log(R_{air})-\log((V_1/V_2)_{air}+\log(V_1/V_2))$ or $\log(V_1/V_2)=\log(R)-\log(R_{air})+\log((V_1/V_2)_{air})$. Since R, and $R_{air}$ are measured quantities and $(V_1/V_2)_{air}$ can be computed, the ratio $V_1/V_2$ can, in principle, be determined and the corresponding value of formation resistivity can be computed using techniques well known in the art. The assumption that $(X_1/X_2)=(X_1/X_2)$air does not, however, directly address errors due to temperature variations under operating conditions. Stated another way, the assumption that $X_1/X_2$ is independent of temperature can introduce error in the final resistivity computation. To compensate for this source of error, the ratio ($X_1/X_2$) is determined for each instrument as a function of temperature. Temperature within the borehole environment varies with depth resulting in a variation in $X_1/X_2$ under operating conditions. In practice, therefore, the term $X_1/X_2$ is not eliminated but rather corrected as a function of the operating temperature in the downhole environment. This technique requires that temperature corrections be made by using the predetermined relationship of $X_1/X_2$ versus temperature along with an independent measurement of operating temperature. This method does not, however, correct the resulting formation resistivity values for errors resulting from mutual coupling between receivers. Although the mutual coupling term is relatively small when compared to other perturbations such as the contribution from the borehole, the mutual coupling term is significant in high accuracy and precision resistivity measurements, especially in highly resistive formations.

A second transmitter has been employed with the receiver pairs to further improve formation resistivity measurements by eliminating some of the previously discussed sources of error. More specifically, a longitudinal sequence of transmitter-receiver-receiver-transmitter on the support body has been employed with symmetrical spacing of all elements about a point midway between the two receivers. One technique involves the alternate measuring of voltage induced by one transmitter in the two receivers with the second transmitter being inactive or "OFF". This method also eliminates the previously discussed ratio of receiver impedance terms and, in addition, eliminates the previously discussed sources introduced by temperature variations since the necessity to make "air" readings is eliminated. Again, mutual coupling between receivers is not addressed introducing a source of error which is especially significant in measurements made in highly resistive formations.

BRIEF SUMMARY OF THE INVENTION

The current invention is a single switching method for eliminating the effects of electromagnetic coupling between pairs of receivers in an apparatus for measuring the resistivity of earth formations. The invention also incorporates the elimination of adverse effects of changes of receiver impedance or "antenna drift". The preferred embodiment comprises, but is not limited to, two transmitters and two receivers which are longitudinally spaced along the axis of an elongate downhole measuring apparatus and which are symmetrically positioned about a point midway between the two receivers.

The measuring cycle consists of four steps which will be outlined briefly in this section and described in detail in a following section. A receiver is defined as being inactive or "OFF" when the impedance of the receiver antenna is increased to a level such that the current flowing in the antenna is so small that the field component generated by this current at a second receiver is negligible when compared to the total field at the second receiver. In the first step, the first transmitter is activated which will be henceforth designated as "ON", the first receiver is OFF, the second receiver is ON, and the second transmitter is OFF. The voltage induced within the second receiver is measured and stored. In the second step, the first transmitter is again ON, the first and second receivers are ON, and the second transmitter remains OFF. Voltages induced within the first and second transmitters are measured and stored. In the third step, the first transmitter is turned OFF, the first and second receivers remain ON, and the second transmitter is turned ON. Again, voltages induced within the first and second transmitters are measured and stored. For the fourth and final step, the first transmitter remains OFF, the first receiver is ON, the second receiver is turned OFF, and the second transmitter remains ON. Voltage induced within the first receiver is measured and stored. The ratio of resistivity at two depths of investigation is computed using a predetermined relationship with induced voltages measured during each switching cycle being used as an input. Switching can vary the effective impedance of both transmitter and receiver circuits. As an example, a receiver which is switched OFF and ON sequentially might exhibit a different impedance for each ON cycle due to variations in the impedance of the switching circuitry. It should be noted that each transmitter and each receiver is switched only once during a given switching cycle of the current invention. This single switching feature of the invention allows for compensation of the adverse effects of antenna drift in addition to compensation for mutual receiver coupling as will become apparent in the discussion which follows.

The four step switching cycle is sequentially repeated as the downhole measuring apparatus is conveyed along the borehole yielding the stated resistivity measurements as a function of depth.

The current invention requires no precisely timed switching of either the transmitters or the receivers since each element of the transmitter-receiver array is switched only once during a given cycle. The receivers are not limited to voltage type receivers but they can also be current type receivers wherein the induced current rather than the induced voltage is the actual measured parameter. The invention is not limited to the exact switching cycle as previously described. Other switching cycles may be employed to effectively eliminate the effects of mutual coupling and antenna drift such as reversing the switching sequence of the first and second receivers. Furthermore, the concepts of the current invention are not limited to two transmitters and two receivers but may also be applied to a multiplicity of transmitters and receivers as long as the measurement cycle contains sufficient steps to effectively eliminate or "cancel" all mutual coupling and antenna drift contributions. In addition, the invention is not restricted to a symmetrical arrangement of transmitters and receivers. This is advantageous if additional transmitters and receivers are added, as an example, to obtain measurements with additional depths of investigations. Data from any combination of transmitters and receivers can be processed even though the spacings between these elements are not symmetrical.

The invention is directed toward the measurement of resistivity of earth formations penetrated by a borehole and more particularly to measurements made during the drilling of a borehole. The invention is not limited to these applications but can be applicable to well logging type measurements which are made subsequent to the drilling operation. The invention is equally applicable to induction resistivity measurements made in pipelines and is further applicable to any type of electromagnetic measurement wherein mutual coupling introduces error in the desired measurement

BRIEF DESCRIPTION OF THE DRAWINGS

So that the manner in which the above recited features, advantages and objectives of the present invention are attained and can be understood in detail, a more particular description of the invention, briefly summarized above, may be had by reference to the embodiment thereof which is illustrated in the appended drawings. It is to be noted, however, that the appended drawings illustrate only typical embodiments of this invention and are therefore not to be considered limiting of its scope, for the invention may admit to other equally effective embodiments.

FIG. 3 illustrates the switching cycle of the preferred embodiment in the form of a timing diagram.

DETAILED DESCRIPTION OF THE PREFERRED EMBODIMENT

Figure 1:
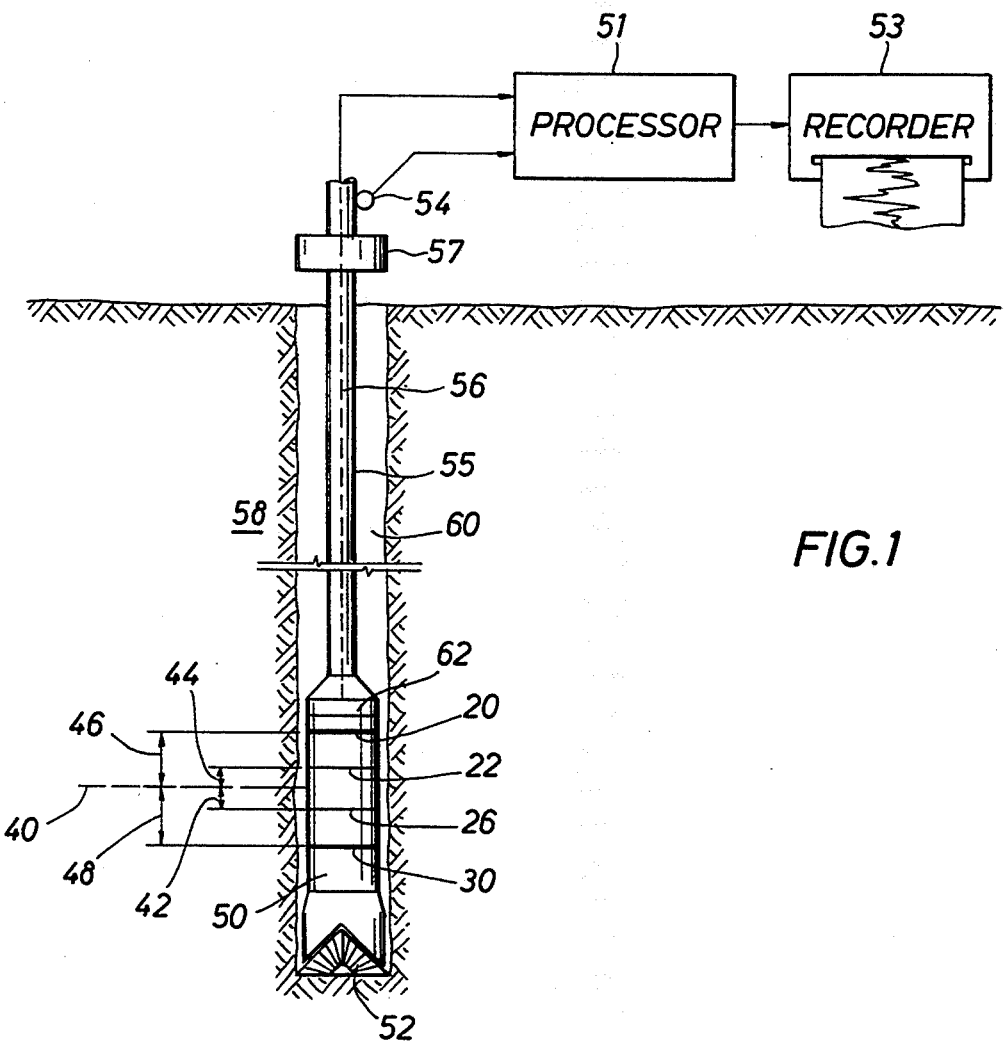
FIG. 1 depicts a transmitter and receiver array used with the invention in a borehole measurement-while-drilling embodiment.

The preferred embodiment of the invention is directed to formation resistivity measurements carried out during the drilling operation. The invention is not limited to measurement-while-drilling (MWD) applications but is equally applicable to well logging systems, pipeline detection devices, surface measuring systems or any type of measurement wherein mutual coupling introduces error in the desired measurement. FIG. 1 illustrates an MWD embodiment of the invention. A drill string 55 is driven by a rotary table 54 which in turn rotates the drill bit 52 thereby drilling a borehole 60 which penetrates the earth formation 58. The subassembly designated generally by the numeral 50 comprises transmitters 20 and 30 and receivers 22 and 26. The transmitters and receivers comprise coils of one or more windings about the outside diameter of the subassembly 50. The subassembly also includes control circuitry (not shown) comprising, in the preferred embodiment, a microprocessor, a clock, switches to change the status of the transmitters and receivers between ON and OFF, alternating current and direct current power supplies to operate the aforementioned components. The microprocessor cooperates with the clock and is preprogrammed to switch each transmitter and receiver element. OFF and ON in a given sequence for a given period of time by means of timing pulses supplied to the switches. The sequence and timing will be discussed in detail in a subsequent section. Each transmitter, under control of the microprocessor and clock, is placed in the ON status by closing a switch thereby applying an alternating current to the transmitter coils, and placed in the OFF status by opening the switch thereby disconnecting the source of alternating current. Each receiver, again under the control of the microprocessor and clock, is placed in the ON status by closing a switch thereby minimizing the antenna coil impedance, and placed in the OFF status by opening the switch thereby maximizing the impedance of the antenna coil. The given sequence of transmitter and receiver switching in which each element is switched one time between the OFF and ON status comprises a switching cycle. Once the cycle has been completed, the clock is reset and the switching cycle is repeated. Signals from receivers, controlled by the microprocessor 62, are telemetered to the surface by drilling fluid pulsing techniques as indicated by the broken line 56. The numeral 54 identifies a depth measure system means for determining the depth of subassembly 50 in the borehole 60. Signals from the receivers 22 and 26 as well as data from the depth measuring means 54 are input to the processor 51 wherein the desired formation resistivity information is computed as a function of depth and output to a recorder 53. The receivers 22 and 26 are axially and symmetrically spaced about a reference or "measure" point 40 such that the distances 42 and 44 are equal. The transmitters 20 and 30 are axially spaced about measure point 40 at equal distances 46 and 48, with distance 46 being greater than distance 44. In the preferred embodiment, the power output of the transmitters is approximate equal although this is not a limiting constraint on the invention. The sensitivities of the receivers are also approximately equal in the preferred embodiment where, again, this is not a limiting constraint on the invention. Furthermore, the transmitters and receivers do not have to be positioned in axial symmetry about the measure point 40. The degree of flexibility of physical and electronic constraints will become apparent in later discussions.

FIGS. 2a through 2d depict graphically the four switching sequences in a complete measurement cycle of the preferred embodiment. The following terminology will be used for brevity in describing the switching steps. Transmitter 30 will be referred to as transmitter number 1 or "T1" and transmitter 20 will be referred to as transmitter number 2 or "T2". Receiver 28 will be referred to as 30 receiver number 1 or "R1", and receiver 22 will be referred to as receiver number 2 or "R2".

Figure 2:
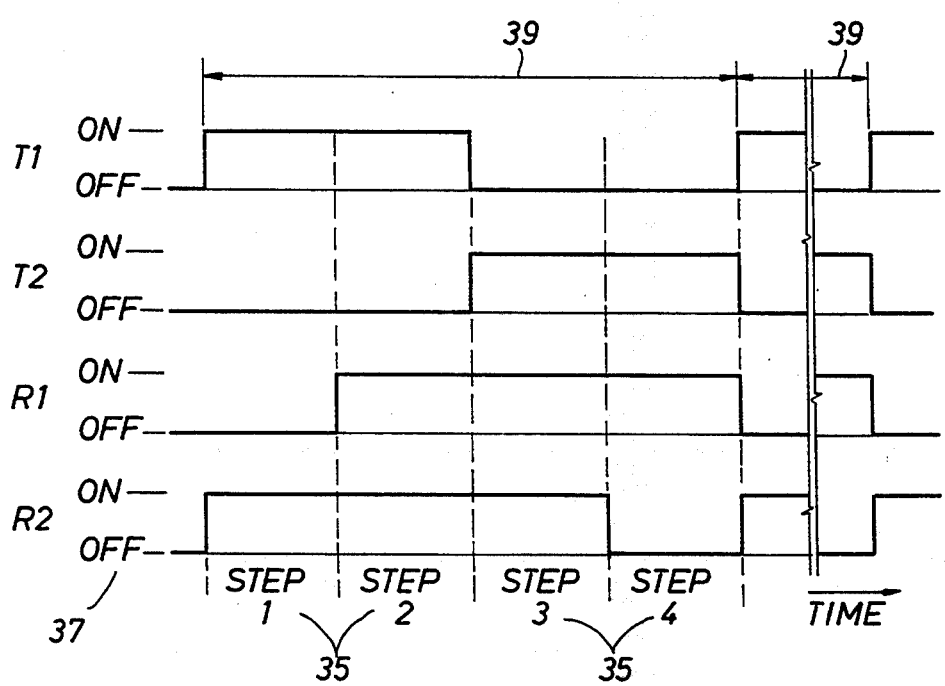
FIGS. 2a-2d illustrate the four step transmitter and receiver switching cycle of the preferred embodiment of the invention.
Figure 2A:
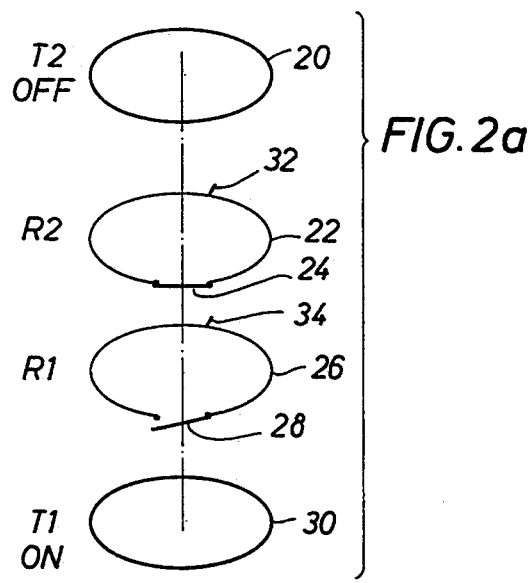

The first step of the switching cycle is shown in FIG. 2a. T1 is ON and T2 is OFF. R2 is ON as is depicted by closed switch 24 and R1 is OFF as depicted by open switch 28. The voltage $V_{2m}$ induced in R2 is measured at a receiver contact point designated by the numeral 32.

Figure 2B:
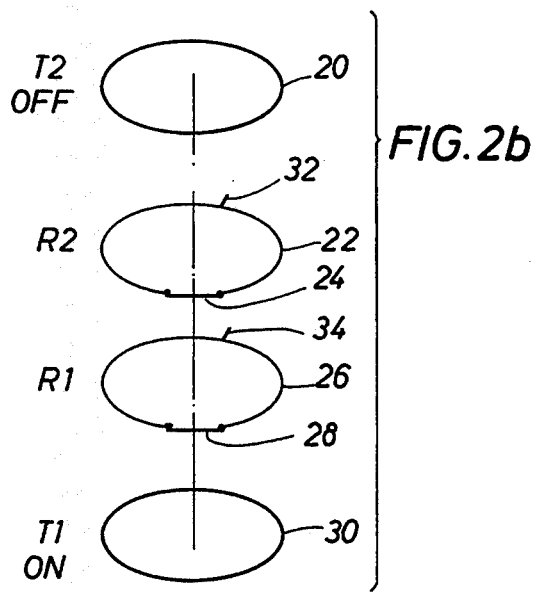

The second step of the switching cycle is shown in FIG. 2b. T1 is again ON and T2 is OFF. In this step, both R1 and R2 are ON. Induced voltages $W_2$ and $W_1$ are measured at the receiver contact points 32 and 34, respectively.

Figure 2C:
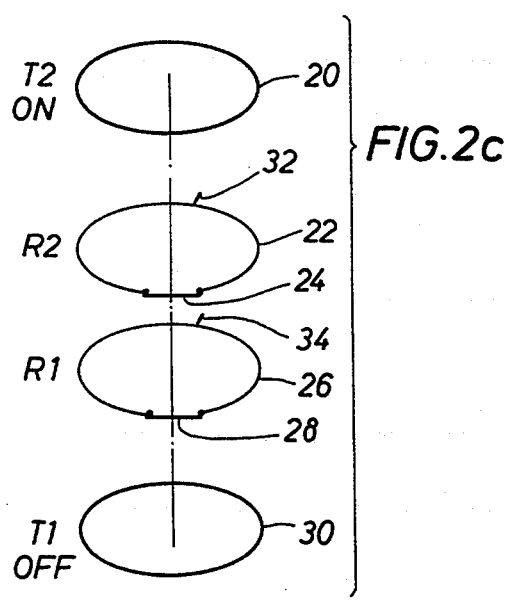

The third step of the switching cycle is depicted in FIG. 2c. T2 is now ON while T1 is OFF. R2 and R1 remain ON. The induced voltages $W'_2$ and $W'_1$ are measured at contact points 32 and 34, respectively.

Figure 2D:
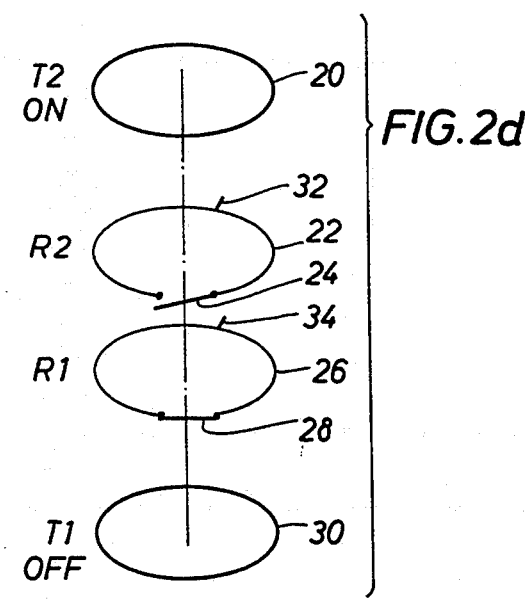

The fourth step in the switching cycle is shown in FIG. 2d. T2 remains ON while T1 remains OFF. R2 is now OFF while R1 remains ON. Induced voltage $V'_{1m}$ is measured at receiver contact point 34.

FIG. 3 depicts the switching cycle in the form of a time diagram. The ON and OFF conditions for transmitters T1 and T2 as well as receivers R1 and R2 are identified by the numeral 37. Steps 1 through 4 are depicted by equal time intervals 35 for purposes of illustration only. Such equal time intervals for the steps is not a limitation of the invention. A complete four step switching cycle is identified by the numeral 39. The timing diagram of FIG. 3 clearly illustrates that each and every element of the transmitter/receiver array is switched only once during a given switching cycle. This eliminates changes in the impedances of the receivers during a given switching cycle resulting from changes of impedance in the switching circuits.

The measured quantities obtained in steps 1 through 4 are expressed mathematically as follows:

Step 1

$$V_{2m} = V_2 X_2 S_1 \tag{1}$$

Step 2

$$W_2 = (V_2 X_2 S_1) + (M_{12} W_1) \quad (2)$$

$$W_1 = (V_1 X_1 S_1) + (M_{21} W_2) \quad (3)$$

Step 3

$$W'_2 = (V'_2 X_2 S_2) + (M_{12} W'_1) \quad (4)$$

$$W'_1 = (V'_1 X_1 S_2) + (M_{21} W'_2) \quad (5)$$

Step 4

$$V'_{1m} = (V_1 X_1 S_2) \quad (6)$$

where:
- $V_1$ = the unperturbed voltage signal generated at receiver R1 by transmitter T1;
- $V_2$ = the unperturbed voltage signal generated at receiver R2 by transmitter T1;
- $V'_1$ = the unperturbed voltage signal generated at receiver R1 by transmitter T2;
- $V'_2$ = the unperturbed voltage signal generated at receiver R2 by transmitter T2;
- $X_1$ = the impedance associated with R1;
- $X_2$ = the impedance associated with R2;
- $M_{12}$ = the mutual coupling factor for voltage induced in R2 by current flowing in R1;
- $M_{21}$ = the mutual coupling factor for voltage induced in R1 by current flowing in R2;
- $S_1$ = a term related to the power of transmitter T1; and
- $S_2$ = a term related to the power of transmitter T2.

Combining equations (2) and (1) and solving for $M_{12}$ yields $$M_{12} = (W_2 - V_{2m})/W_1. \quad (7)$$

Since all terms on the right hand side of equation (7) are measured, the mutual coupling term $M_{12}$ can be computed. Likewise, combining equations (5) and (6) and solving for the mutual coupling term $M_{21}$ yields $$M_{21} = (W'_1 - V'_{1m})/W'_2 \quad (8)$$

where again the terms on the right hand side of equation (8) are measured allowing the second mutual coupling term $M_{21}$ to be computed. Combining equations (2) and (3) yields $$(V_1/V_2) = (X_1/X_2)[(W_1 - M_{21} W_2)/(W_2 - M_{12} W_1)]. \quad (9)$$

Combining equations (4) and (5) yields $$(V'_2/V'_1) = (X_1/X_2)[(W'_2 - M_{12} W'_1)/(W'_1 M_{21} W'_2)]. \quad (10)$$

Resistivity or other electromagnetic properties are computed from the product of ratios KAT defined by the equation $$RAT = (V_1/V_2)(V'_2/V'_1). \quad (11)$$

Substituting equations (9) and (10) into equation (11) yields $$RAT = [(W_1 - M_{21} W_2)(W'_2 - M_{12} W'_1)]/[(W_2 - M_{12} W_1)(W'_1 - M_{21} W'_2)] \quad (12)$$

where all of the terms on the right hand side of equation (12) are either directly measured or have been previously computed. Equation (12) serves as a working equation which is independent of mutual receiver coupling, antenna drift and transmitter power factors, and is the quantity from which formation parameters of interest are determined.

The four step cycle is repeated sequentially as resistivity or other parameters are measured as a function of time or as a function of depth along a borehole in the preferred embodiment. The computed values of formation parameters such as resistivity are independent of mutual coupling between receivers and antenna drift since parameters related to these effects are eliminated in the previously described data processing method. It should also be noted that the computed parameters such as resistivity are also independent of the phase and power of the transmitters since all terms related to these factors are mathematically eliminated in the data processing method.

A second embodiment of the invention is presented wherein only one transmitter and two receivers are employed. Design restrictions or other factors might limit the resistivity device to only one transmitter. Stated briefly, mutual coupling between receivers is eliminated by electrically opening and closing the coils of the receiver pairs. The need to make readings with the device suspended in air or some other calibration method, which is eliminated with the previous embodiment, is again required due to the elimination of the second transmitter. Once again, the receivers are designated to be "ON" and "OFF" when the coils are electrically closed and open, respectively. Induced voltage measurements are closed and open, respectively. Induced voltage measurements are made at a given receiver only when the other receiver is OFF. Using the same terminology as in previous discussions, $$V_{1m} = V_1 X_1 S \quad (12)$$

and $$V_{2m} = V_2 X_2 S \quad (13)$$

where in this embodiment, $V_{1m}$ is the voltage measured at the receiver nearest the transmitter with the second receiver OFF and $V_{2m}$ is the voltage measured at the second receiver with the first receiver OFF. Mutual coupling between receivers is not a factor since induced voltages are always made with only one receiver ON. The working equation is again $\log(V_2/V_1) = \log(R) - \log(R_{air}) + \log((V_1/V_2)_{air})$ with the assumption again being that $(X_2/X_1) = (X_2/X_1)_{air}$. The assumption is again questionable and introduces error into the resistivity calculation. This is primarily due to the possibility that sequentially switching the receiver coils ON and OFF in air and in operation can cause changes In the impedance of the switching circuits which, in turn, cause the relative impedance of the two receivers to vary. Scared another way, the logarithm of the impedance ratio as determined by the "air" measurement may not represent the corresponding quantity in borehole operation. This variance will be reflected as error in the formation resistivity determination and will again be more prevalent in formations of high resistivity. The embodiment employing dual transmitters eliminated this source of error by eliminating the need for air measurement. Still, this second embodiment of the present invention represents a substantial improvement over prior art in that the mutual coupling between receivers is eliminated.

The principle and the mode of operation of the invention have been explained and illustrated in the preferred embodiments. It must, however, be understood that the invention may be practiced otherwise than as specifically illustrated and described without departing from its spirit or scope. For example, the switching sequence of the receivers can be modified, the number of elements in the transmitter-antenna array can be expanded and current type receivers rather than voltage type receivers can be employed. Therefore, such changes and modifications are included within the scope and spirit of this invention, and will be limited in scope only by the claims appended hereto.

What is claimed is:

1. A single switching method for an array of transmitters and receivers positioned in the vicinity of earth formation, comprising the steps of:
   (a) providing at least two transmitters and two receivers in said array;
   (b) defining a switching cycle for said elements in said array wherein each element is switched between an ON status and an OFF status one time during said cycle, wherein only one said transmitter is in said ON status during any time interval of said switching cycle;
   (c) inducing electromagnetic fields in material surrounding said array during said switching cycle by switching said transmitters to said ON status;
   (d) measuring the responses of said receivers to said induced electromagnetic fields during said switching cycle by switching said receivers to said ON status such that each receiver is ON during a period of time in which each transmitter is ON; and
   (e) combining said measured responses of said receivers to obtain a signal which is indicative of the electrical properties of said surrounding material and which is independent of mutual coupling between said receivers or changes in electrical impedance of said receivers or both.

2. The method of claim 1 wherein said array of transmitters and receivers is conveyed along a borehole and said material surrounding said array is earth formation penetrated by said borehole.

3. The method of claim 2 wherein said electrical properties of said surrounding material comprise the resistivity of said material.

4. The method of claim 3 wherein said switching cycle and said resistivity determination is repeated sequentially as said array is conveyed along said borehole.

5. The method of claim 4 wherein said response of the receivers is voltage resulting from said electromagnetic field induced in said earth formation by said transmitters.

6. The method of claim 5 wherein said method of conveyance of said array within said borehole is a drill string.

7. A single switch apparatus for control of an array of transmitters and receivers to enable execution of a selected sequence repetitively executed by said array of transmitters and receivers so that said array is operated to provide receiver responses free of undesired effects wherein the switch apparatus comprises;
   (a) a processor;
   (b) an array of transmitters and receivers positioned to form receiver responses indicative of resistivity wherein transmitters and receivers of said array are switched between an ON status and an OFF status once in a selected sequence during a switching cycle;
   (c) switching means comprising a microprocessor operated in a repetitively executed sequence defining a switching cycle for activating and deactivating said transmitters and receivers of said array during said switching cycle such that:
   each receiver is ON for a period of time during which each transmitter is ON and
   one receiver is ON for a shorter period of time than the other receivers of said array during the time period in which each of said transmitters is ON;
   (d) said switching means sequentially repeating said switching cycle upon completion of a previous switching cycle and reactivating said switching means;
   (e) means for measuring the response of said receivers of said array resulting from the emission of electromagnetic radiation by said transmitters;
   (f) wherein said processor is provided with said measured receiver responses; and
   (g) said processor operates in accordance with a mathematical relationship for combining responses of said receivers such that said combined response is indicative of resistivity and is independent of mutual coupling of said receivers or independent of antenna drift of said receivers or both.

8. The apparatus of claim 7 wherein said array comprises two transmitters and two receivers.

9. The apparatus of claim 7 wherein said array is conveyed along a borehole by a drill string.

10. The apparatus of claim 7 wherein said array is conveyed along a borehole by a wireline.

11. A single switching method for an array of two transmitters and two receivers operating in a borehole, comprising the steps of:
   (a) providing a first and a second transmitter and a first and a second receiver positioned axially and symmetrically about a point midway between said first and said second transmitters;
   (b) defining a switching cycle for said transmitters and said receivers of said array wherein each transmitter and each receiver is switched one time between an ON status and an OFF status during said switching cycle, and wherein only one said transmitter is in said ON status during any time interval of said switching cycle;
   (c) inducing electromagnetic fields in the borehole environs in the vicinity of said array by alternately switching said first transmitter and said second transmitter to said ON status during said switching cycle;
   (d) switching said first receiver and said second receiver to said ON status thereby measuring the responses of said first and said second receivers to said induced electromagnetic fields induced by each said transmitter during said switching cycle, wherein
   each said receiver is in said ON status for a portion of the time period in which each said transmitter is in said ON status, and
   each said receiver is in said ON status simultaneously for a length of time which is shorter than the length of time in which one said receiver is in said ON status during said switching cycle;
   (e) combining said receiver responses measured during one said switching cycle therein obtaining a signal which is independent of mutual coupling between said first and said second receivers, or changes in the impedances of said first and said second receivers, or both; and (f) relating said signal to the resistivity of earth formation and borehole environs in the vicinity of said array.

12. The method of claim 11 wherein said array is conveyed along the borehole by the drill string.

13. The method of claim 12 wherein said switching cycle and said corresponding resistivity determinations are repeated sequentially as a function of the depth of said array within said borehole.

14. The method of claim 13 wherein said switching cycle comprises the steps of:
(a) activating said first transmitter and said second receiver while said first receiver and said second transmitter are inactive and measuring a first voltage induced in said second receiver;
(b) with said first transmitter and said second receiver remaining activated and said second transmitter remaining inactive, activating said first receiver and measuring a second voltage induced in said first receiver and a third voltage induced in said second receiver;
(c) deactivating said first transmitter and activating said second transmitter while said first and said second receivers remain activated and measuring a fourth voltage induced in said first receiver and a fifth voltage induced in said second receiver; and
(d) with said first receiver remaining inactive and said second transmitter remaining active and said first receiver remaining activated, deactivating said second receiver and measuring a sixth voltage induced in said first receiver.

15. The method of claim 14 wherein said first through six measured voltages are combined to yield a ratio of voltages measured by said first and said second receivers, with said voltage ratio being independent of mutual coupling between said first and second receivers or impedance variations of said first or said second receivers or both.

16. A single switch apparatus for control of an array of at least one transmitter and receivers to enable execution of a selected sequence repetitively executed by said array of transmitter and receivers so that said array is operated to provide receiver responses free of undesired effects wherein the switch apparatus comprises;
(a) a processor;
(b) an array of a transmitter and plural receivers in said array wherein said transmitter and receivers positioned to form receiver responses indicative of resistivity wherein transmitter and receivers are switched between an ON status and an OFF status once in a selected sequence during a switching cycle, and
each receiver is ON for a period of time during which said transmitter is ON and
one receiver is ON for a shorter period of time than the other receivers of said array during the time period in which each said transmitter is ON;
(c) switching means comprising a microprocessor operated in a repetitively executed sequence defining a switching cycle for activating and deactivating said transmitter and receivers of said array during said switching cycle;
(d) said switching means sequentially repeating said switching cycle upon completion of a previous switching cycle and reactivating said switching means;
(e) means for measuring the response of said receivers of said array resulting from the emission of electromagnetic radiation by said transmitter;
(f) wherein said processor is provided with said measured receiver responses; and
(g) said processor operates in accordance with a mathematical relationship for combining said receiver responses so that said combined response is indicative of resistivity and is independent of mutual coupling of said receivers or independent of antenna drift of said receivers of both.

17. The apparatus of claim 16 wherein said array comprises one transmitter and two receivers.

18. The apparatus of claim 16 wherein said array is conveyed along a borehole by a drill string.

19. The apparatus of claim 16 wherein said array is conveyed along a borehole by a wireline.

20. A single switching method for an array of one transmitter and two receivers operating in a borehole, comprising the steps of:
(a) providing a transmitter and a first and a second receiver positioned axially along a device conveyed along said borehole;
(b) defining a switching cycle for said elements of said array wherein each element is switched one time between an ON status and an OFF status during said switching cycle;
(c) inducing electromagnetic fields in the borehole environs in the vicinity of said array by switching said transmitter to said ON status during said switching cycle;
(d) measuring the response of said first and said second receivers to said induced electromagnetic fields induced during said switching cycle by sequentially switching said receivers to said ON status while said transmitter is Switched to said ON status;
(e) combining said receiver responses measured during one said switching cycle therein obtaining a signal which is independent of mutual coupling between said first and said second receivers; and
(f) relating said signal to the resistivity of earth formation and borehole environs in the vicinity of said array.

21. The method of claim 20 wherein said array is conveyed along the borehole by a drill string.

22. The method of claim 20 wherein said array is conveyed along the borehole by a wireline.

23. The method of claim 20 wherein said switching cycle and said corresponding resistivity determinations are repeated sequentially as a function of depth of said array within said borehole.

24. The method of claim 23 wherein said switching cycle comprises the steps of:
(a) switching said transmitter to an ON status and switching said first receiver to an ON status and switching said second receiver to an OFF status and measuring a first voltage induced in said first receiver; and
(b) with said transmitter remaining in said ON status, switching said first receiver to an OFF status and switching said second receiver to an ON status and measuring a second voltage induced in said second receiver.

25. The method of claim 24 wherein said first and said second measured voltages are combined to yield a ratio of voltages measured by said first and said second receivers, with said voltage ratio being independent of mutual coupling between said first and said second receivers and being indicative of formation resistivity.

26. A method for eliminating the effects of mutual coupling between at least two receivers comprising the steps of (a) defining a switching cycle for said receivers wherein each receiver is switched between an ON status and an OFF status one time during said switching cycle and wherein, during each said switching cycle, said receivers are in said ON status simultaneously for a length of time which is shorter than the length of time in which one receiver is in said ON status;

(b) measuring the voltage response of said receivers to electromagnetic radiation while said receivers are in said ON status during said switching cycle; and (c) combining said measured responses of said receivers to obtain a signal which is indicative of the electromagnetic properties of material in the vicinity of said receivers and wherein said combination of measured responses mathematically eliminates contributions to said measured responses resulting from mutual coupling between said receivers.

27. A receiver apparatus comprising:

(a) an array of two or more receivers;

(b) at least one switch cooperating with each receiver in said array;

(c) means for operating said switches according to a predetermined switching cycle such that each said receiver is switched once between an ON status and an OFF status during said switching cycle and wherein, during said switching cycle, said receivers are simultaneously in said ON status for a length of time which is shorter that the length of time in which at least one receiver is in said ON status;

(d) means for measuring the responses of said receivers to electromagnetic radiation while said receivers are in said ON status during said switching cycle; and (e) means for combining said measured responses of said receivers such that the effects of mutual coupling between said receivers are eliminated from said combination of said measured responses and wherein said combination of receiver responses is indicative of electromagnetic properties of material in the vicinity of said receivers.

* * * * *